(12) United States Patent
Huynh

(10) Patent No.: US 8,382,368 B2
(45) Date of Patent: Feb. 26, 2013

(54) TEMPERATURE DETECTION DEVICE FOR THE PASSENGER COMPARTMENT OF A VEHICLE

(75) Inventor: Tan Duc Huynh, Neuilly sur Marne (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 612 days.

(21) Appl. No.: 12/528,736

(22) PCT Filed: Feb. 29, 2008

(86) PCT No.: PCT/EP2008/052487
§ 371 (c)(1),
(2), (4) Date: Oct. 1, 2009

(87) PCT Pub. No.: WO2008/107383
PCT Pub. Date: Sep. 12, 2008

(65) Prior Publication Data
US 2010/0014556 A1    Jan. 21, 2010

(30) Foreign Application Priority Data
Mar. 1, 2007   (FR) ...................................... 07 01462

(51) Int. Cl.
*B60H 1/00*       (2006.01)
*G01K 1/14*       (2006.01)
*G01K 1/20*       (2006.01)
(52) U.S. Cl. .......................... 374/141; 374/148; 374/208
(58) Field of Classification Search .................. 374/109, 374/110, 111, 112, 115, 137, 138, 141, 147, 374/148, 166, 208
See application file for complete search history.

(56) References Cited

U.S. PATENT DOCUMENTS

| | | | |
|---|---|---|---|
| 4,143,706 A | 3/1979 | Schnaibel et al. | |
| 5,104,062 A | 4/1992 | Glaze | |
| 6,655,833 B1 | 12/2003 | Melin | |
| 6,709,155 B2 * | 3/2004 | Knittel et al. | 374/141 |
| 6,843,424 B2 * | 1/2005 | Weber et al. | 236/49.3 |
| 6,997,605 B2 * | 2/2006 | Trapp et al. | 374/172 |
| 7,387,437 B2 * | 6/2008 | Brown et al. | 374/141 |
| 2006/0203886 A1 | 9/2006 | Karmazyn | |

FOREIGN PATENT DOCUMENTS

| | | |
|---|---|---|
| DE | 41 42 648 C1 | 4/1993 |
| DE | 196 21 092 A1 | 11/1997 |
| EP | 0 413 463 A1 | 2/1991 |
| EP | 1413463 A2 * | 4/2004 |
| EP | 2199125 A2 * | 6/2010 |
| FR | 2 359 717 A | 2/1978 |

(Continued)

OTHER PUBLICATIONS

International Search Report w/translation from PCT/EP2008/052487 dated Jul. 23, 2008 (6 pages).

*Primary Examiner* — R. A. Smith
(74) *Attorney, Agent, or Firm* — Osha Liang LLP

(57) ABSTRACT

The invention relates to a temperature detection device (1) for detecting the temperature (Ta) of the air (A) in the passenger compartment (100) of a vehicle, that comprises at least one temperature sensor (2) provided in an air duct (4) having a first portion (5), said air duct (4) being in aeraulic communication with the air of the (A) of the passenger compartment (100) through said first portion (5). The temperature detection device (1) includes means capable of preventing the direct influence of solar rays (RS) on the temperature sensor (2).

15 Claims, 3 Drawing Sheets

FOREIGN PATENT DOCUMENTS

| | | | | |
|---|---|---|---|---|
| FR | 2554925 | A1 | * | 5/1985 |
| FR | 2796460 | A1 | * | 1/2001 |
| FR | 2912503 | A1 | * | 8/2008 |
| FR | 2919524 | A1 | * | 2/2009 |
| JP | 09329503 | A | * | 12/1997 |
| JP | 2004125427 | A | * | 4/2004 |
| JP | 2011169614 | A | * | 9/2011 |
| WO | 01/30597 | A1 | | 5/2001 |

\* cited by examiner

TEMPERATURE DETECTION DEVICE FOR THE PASSENGER COMPARTMENT OF A VEHICLE

The technical field of the present invention is that of temperature sensors for vehicle passenger compartments.

These days, motor vehicles are increasingly being fitted with ventilation, heating and/or air conditioning systems. These ventilation, heating and/or air conditioning systems are provided with temperature detection devices comprising temperature sensors in order to measure the air to be treated at different places in the vehicle passenger compartment. The temperature detection devices are therefore essential for best regulating the air in the passenger compartment.

In order to determine as accurately as possible the temperature of the air in the passenger compartment, the temperature detection devices are often accompanied by a sunshine sensor in order to include the solar radiations to which the temperature sensors have been subjected in the calculation of the air temperature in the passenger compartment.

A major problem with the use of sunshine sensors to improve the calculation of the air temperature in the passenger compartment via temperature sensors is the cost of such sunshine sensors.

Another drawback of the state of the art cited hereinabove is that the two types of sensors must be located at the level of the surface of the control panel or of the dashboard on which they are located. This surface location is necessary to take account of the solar radiations and be in contact with the air in the passenger compartment.

Moreover, this location of the temperature sensors and of the sunshine sensors at the level of a façade surface, such as a control panel, requires them to be mechanically protected by encapsulation and for them to be decorated or for them to be painted since they form a part of the style elements of the façade.

Another drawback is the overall cost of a temperature detection device including a temperature sensor and a sunshine sensor. Furthermore, the mechanical protection by encapsulation and/or the decoration for design purposes increases the manufacturing price of such a temperature detection device.

The aim of the present invention is therefore to resolve the drawbacks described hereinabove, mainly by providing the temperature detection device with a means preventing the direct influence of solar rays on the temperature sensor. Thus, the temperature sensor is not influenced by the solar radiation and the presence of a sunshine sensor is no longer required.

The subject of the invention is therefore a temperature detection device specifically for detecting the temperature of the air in a passenger compartment of a vehicle, comprising at least a temperature sensor housed in an air duct having a first portion, said air duct being in aeraulic communication with the air of the passenger compartment through the first portion, characterized in that the first portion has the shape of a grid to prevent the direct influence of solar rays on the temperature sensor.

According to a first characteristic of the invention, the temperature sensor is spaced apart from the first portion by a distance of between 1 and 10 mm.

The spacing of the temperature sensor relative to the first portion further enhances the protection of the sensor by preventing the direct impact of the solar rays on the temperature sensor. Thus, the temperature sensor is not influenced by the solar rays.

According to another characteristic of the invention, the first portion of said air duct is housed in a façade.

According to yet another characteristic of the invention, the grid is an integral part of the façade.

According to yet another characteristic of the invention, the air duct is arranged vertically relative to the façade. The layout of the air duct is such that the temperature sensor is not directly exposed to the solar rays.

According to another characteristic of the invention, the air duct is open at both its ends.

According to yet another characteristic of the invention, the air duct has a length of between 10 and 100 mm and a width of between 10 and 30 mm.

Advantageously, at least two temperature sensors are placed on an electronic card and are housed in the air duct.

Also advantageously, the two temperature sensors are thermally coupled.

Also advantageously, a first temperature sensor is spaced apart from a second temperature sensor by a distance of between 5 and 30 mm so as to measure two different temperatures.

Also advantageously, the first temperature sensor is located alongside the first end of the air duct and the second temperature sensor is located alongside the second end of the air duct.

The invention also relates to a control panel including a temperature detection device according to one of the preceding characteristics.

Advantageously, the distance between a second end of the air duct and a main electronic card is between 1 and 20 mm.

Other characteristics, details and advantages of the invention will emerge more clearly from reading the description given hereinbelow by way of indication in relation to the drawings in which.

Figure 1:
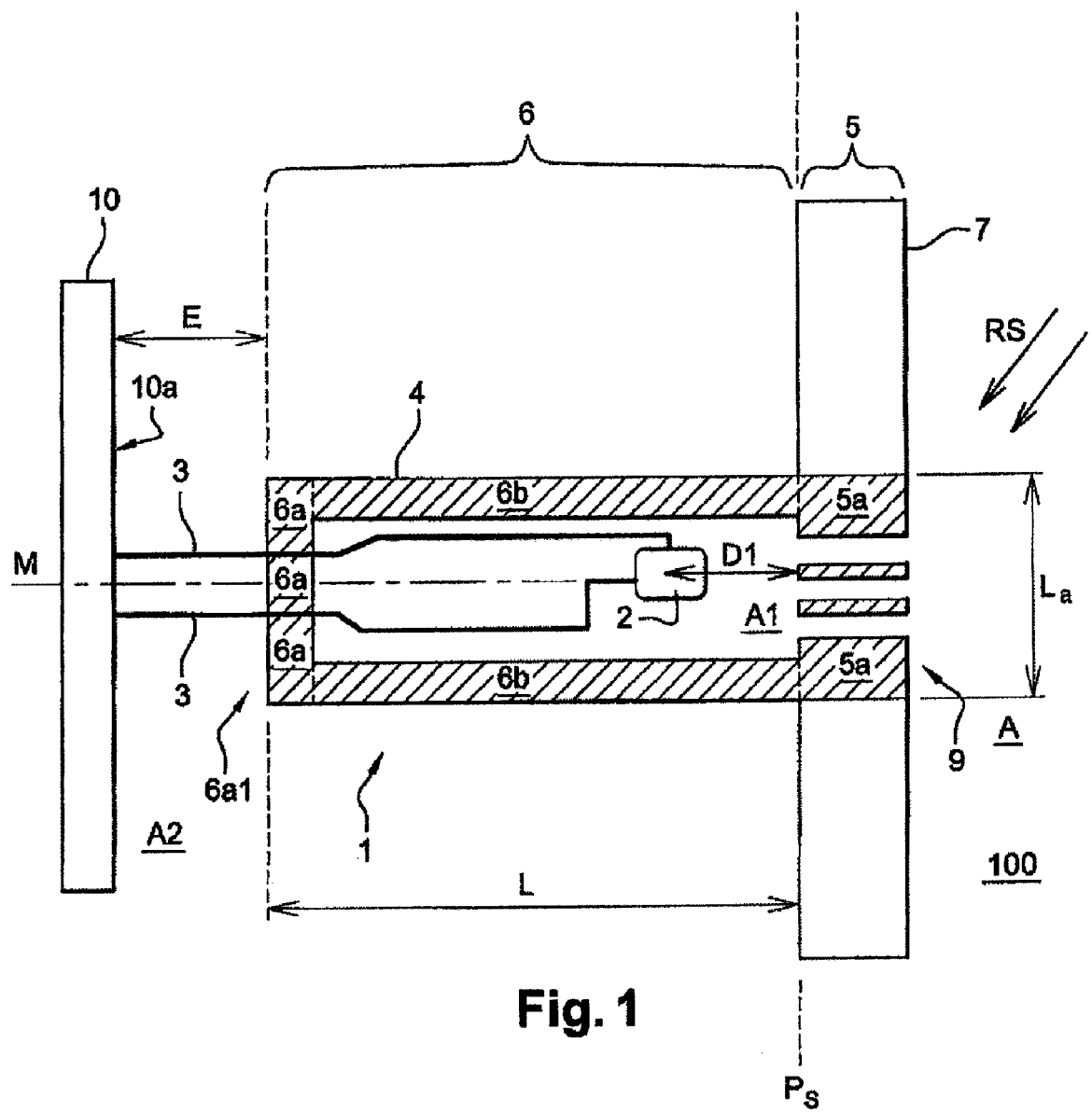
FIG. 1 is a cross-sectional view of a temperature detection device according to a first embodiment of the invention.

FIG. 1 illustrates a temperature detection device 1 comprising a temperature sensor 2. This temperature detection device 1 is used to detect the temperature Ta of the air A in a passenger compartment 100 of a motor vehicle. The temperature sensor 2 is housed in an air duct 4 comprising two portions 5, 6. The air duct 4 is hollow and made of plastic material. Electrical wires 3 link the temperature sensor 2 to a main electronic card 10.

The air duct 4 is in aeraulic communication with the air A in the passenger compartment 100 through a first portion 5. This first portion 5 comprises a first end 5a of the air duct 4 intended to be integrated in a façade 7 of a control panel of a ventilation, heating and/or air conditioning system, not represented, to provide for aeraulic communication. In other words, the first end 5a is open. The expression "aeraulic communication" should be understood to mean the fact that the air A of the passenger compartment 100 of the vehicle can penetrate into the air duct 4 and leave it.

A second portion 6 is located behind the façade 7, assuming that the back of the façade 7 is the portion of the façade 7 that cannot be seen by a passenger in the vehicle, and comprises the body 6b of the air duct 4 as well as a second end 6a of the air duct 4. The body 6b of the air duct 4 is the portion of the air duct in which the temperature sensor 2 is housed. Generally, so as not to be visible to a passenger in the vehicle, the air duct 4 is located behind the façade of the dashboard of the vehicle or any other item likely to be located in the vehicle passenger compartment, such as, for example, the cladding of a door or the roof of the passenger compartment. The air duct 4 has a rectangular or cylindrical shape. Obviously, the air duct 4 can also be any other shape such as square or ovoid. In the embodiment illustrated in FIG. 1, the second end 6a is closed, which means that the air located inside the air duct 4 can be discharged from the air duct 4 only through the first end 5a. In a variant of the embodiment which is not represented, the second end 6a is open.

The temperature detection device 1 comprises a means specifically for preventing the direct influence of solar rays RS on the temperature sensor 2. The expression "direct influence" should be understood to mean the fact that the temperature sensor is not directly impacted by the solar rays RS. This means comprises either the first portion 5 configured as a grid 8, or the first portion 5 in the shape of a grid 8 and the position of the temperature sensor 2 relative to the first portion 5.

When the passenger compartment 100 of the vehicle is in sunshine, the façade 7 is directly impacted by solar rays RS. Consequently, if the temperature sensor 2 is placed in the façade 7, it will be very strongly influenced by the quantity of heat imparted by the solar rays RS and will give a value for the temperature Ta of the air A in the passenger compartment 100 that is far higher than the real value of the temperature Ta of the air A. This drawback is overcome by configuring the first portion 5 of the air duct 4 as a grid 8.

When the temperature sensor 2 is positioned set back relative to the first portion 5, it is spaced apart from the first portion 5 by a distance D1 of between 1 and 10 mm. Preferably, the distance is 5 mm. This distance is measured between the middle of the temperature sensor 2 and the plane of separation Ps delimiting the second portion 6 from the first portion 5.

The grid 8 is an integral part of the air duct 4. Because of this, the first portion 5 is housed in the façade 7 through a hole 9 able to receive it. It is also possible for this grid 8 to be an integral part of the façade 7. The air duct 4 is then made as one piece with the façade 7.

The air duct 4 is arranged vertically relative to the façade 7. More specifically, a median plane M extending by a length L of the air duct 4 is perpendicular to the plane Ps. This arrangement of the air duct 4 is particularly advantageous when the latter is placed at the level of a control panel. In practice, because of this arrangement, the sun's rays RS cannot reach the temperature sensor 2.

The dimensions of the second portion 6 of the air duct 4 include a length L and a width La. The length L is between 10 and 100 mm and the width La is between 10 and 30 mm. Preferably, the length L of the air duct 4 is 15 mm and the width La is 20 mm.

A main electronic card 10 is spaced apart from the temperature detection device 1, and more particularly from the air duct 4, by a distance E of between 1 and 20 mm. More specifically, the space E is measured between the face 10a of the main electronic card 10 facing the façade 7 and the face 6a1 of the second end 6a facing the main electronic card 10.

Whatever the shape of the means preventing the direct influence of the solar rays RS, the temperature sensor 2 is located in the body 6b of the air duct 4 and measures the temperature Ta1 of the air A1 in the air duct 4. Since the air A1 in the air duct 4 is in contact with the air A in the passenger compartment 100, it is considered that the value Ta1 measured by the temperature sensor 2 corresponds to the value of the temperature Ta of the air A in the passenger compartment. Whatever the structure of the means used, the algorithm for calculating Ta is expressed in the following form: Ta=K*Ta1.

When the means of preventing the direct influence of solar rays RS on the temperature sensor 2 comprise only the grid 8, the temperature sensor 2 is not impacted by the solar rays RS regardless of its position relative to the first portion 5. In this case, the direct influence of the solar rays RS on the temperature sensor 2 no longer exists, and this applies regardless of the position of the temperature sensor 2 relative to the first portion 5. The coefficient K then takes account only of the presence of the grid 8.

When the means of preventing the direct influence of solar rays RS on the temperature sensor 2 comprises both the grid 8 and the position of the temperature sensor 2 relative to the first portion 5, the coefficient K of the calculation algorithm takes into account both the distance D1 and the presence of the grid 8. The distance D1 is the distance between the temperature sensor 2 and the first portion 5, this distance D1 must be taken into account in the algorithm for calculating the temperature Ta of the air A in the passenger compartment 100. The greater the distance D1, the more the temperature sensor 2 is freed from the direct influence of the solar rays RS. The distance D1 is therefore taken into account in the calculations via the coefficient K. In other words, the coefficient K varies according to the distance D1.

The temperature detection device 1 provides the benefit of being obtained at a low manufacturing cost. In this respect, the temperature detection device 1 has no microturbine to suck the air A from the passenger compartment 100 to the air duct 4 in order to measure the temperature Ta. According to the invention, the temperature Ta1 of the air A1 measured by the temperature sensor 2 is considered to represent the temperature Ta of the air A in the passenger compartment. The thermal conduction of the heat of the air A from the passenger compartment 100 to the air A1 inside the air duct 4 enables the temperature sensor 2 to measure a temperature representative of the temperature Ta of the air in the passenger compartment 100. Furthermore, the temperature detection device 1 is inexpensive since it does not include any sunshine sensor. The presence of the grid 8 makes it possible no longer to use any sunshine sensor since the sensor is no longer directly influenced by the solar rays RS. Since the temperature sensor 2 is housed in the body 6b of the air duct 4, an encapsulation, mechanical protection or paint cover is also no longer necessary.

Figure 2:
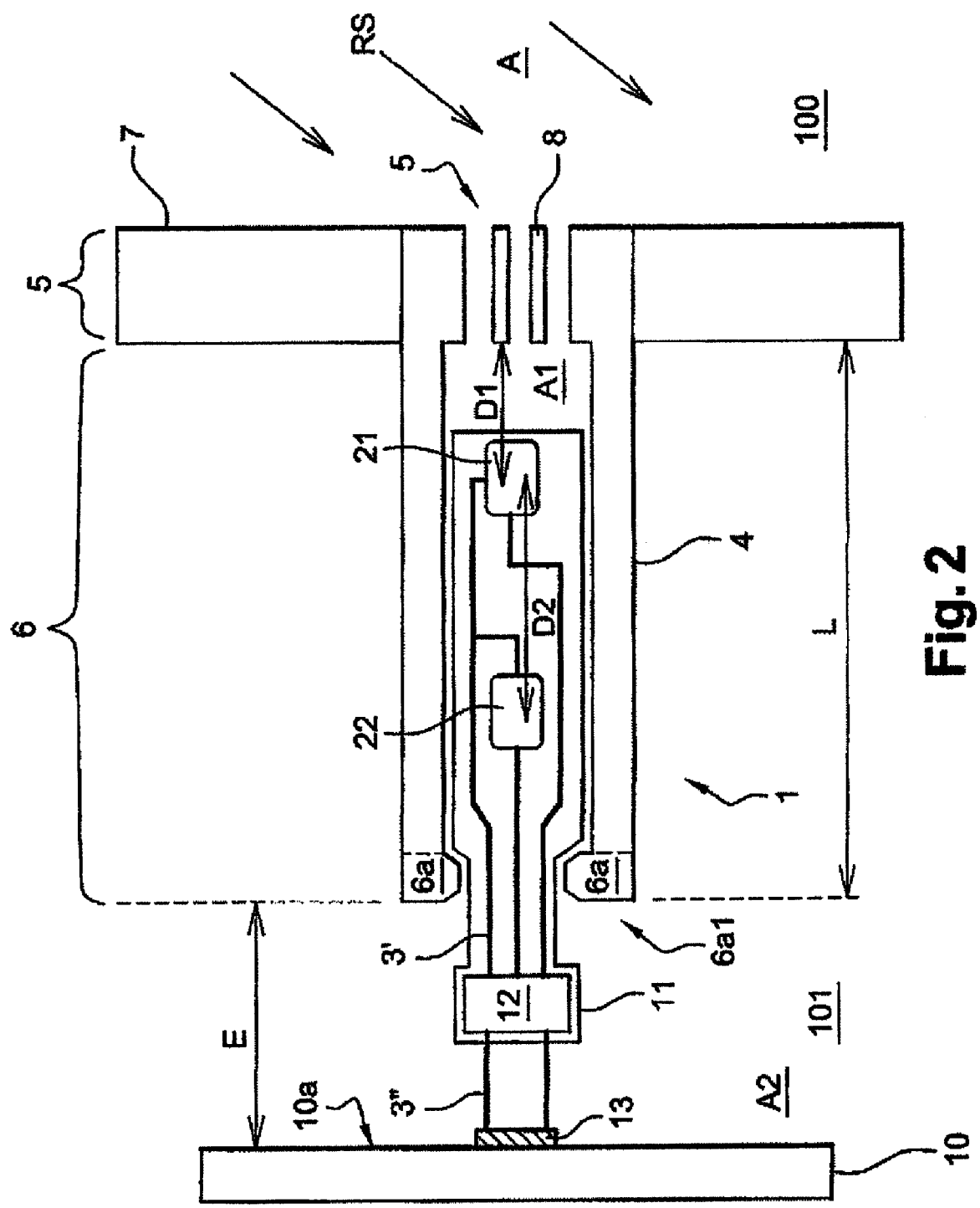
FIG. 2 is a cross-sectional view of a temperature detection device according to a second embodiment of the invention.

The same references as those of FIG. 1 are used to designate the same items. FIG. 2 represents a second embodiment in which the temperature detection device 1 comprises two temperature sensors 21, 22. Both temperature sensors 21, 22 are housed in the air duct 4, and more particularly placed in the body 6b of the air duct 4. Both temperature sensors 21, 22 are placed on an electronic card 11 and more particularly are fixed to the electronic card 11 by any means such as soldering and/or gluing. The electronic card 11 is provided with a first connector 12 linked via connecting wires 3' to both temperature sensors 21, 22. The electronic card 11 is partially housed in the air duct 4. As illustrated, the second end 6a is open and the portion of the electronic card 11 receiving the first connector 12 is projecting from the air duct 4 at the level of the second end 6a. This way, the air duct 4 is in aeraulic communication with the air A in the passenger compartment 100 through a first portion 5 and with the air A2 in the space 101 situated behind the façade 7. The first connector 12 is also linked to a second connector 13 via connecting wires 3". The second connector 13 is fixed to the main electronic card 10. In a variant that is not represented, the electronic card 11 is completely housed in the air duct 4, that is to say that the connector 12 is also housed in the air duct 4, and only the connecting wires 3" pass through the open second end 6a to connect the fist connector 12 to the second connector 13.

A first sensor 21 is placed in the nearby environment of the first portion 5 and a second temperature sensor 22 is placed in the nearby environment of the second end 6a. In other words, the first temperature sensor 21 is located alongside the first portion 5 and the second temperature sensor is located alongside the second end 6a of the air duct 4. This way, the second temperature sensor 22 is much more influenced by the release of heat from electronic and/or electrical components such as the main electronic card 10 compared to the first temperature sensor 21.

The first temperature sensor 21 is spaced apart from the second temperature sensor 22 by a distance D2 of between 5 and 30 mm so as to measure two different temperatures. The greater the distance D2, the more the second temperature sensor 22 will be influenced by the heat from the electronic and/or electrical components and the less the first temperature sensor 21 will be influenced by the heat from these same components. Preferably, the distance D2 is 10 mm. This distance D2 is measured between the respective center of each temperature sensor 21, 22.

Whatever the embodiment, the two temperature sensors 21, 22 are housed in the air duct 4 and more particularly in the body 6b. The two temperature sensors 21, 22 are thermally coupled. This thermal coupling is provided through the electronic card 11. The expression "thermal coupling" should be understood to mean the fact that the two temperature sensors 21, 22 are not thermally insulated from one another. Consequently, they are subject to common thermal influences such as the temperature of the air A1 in the air duct 4, the temperature of the walls of the air duct 4 and/or the temperature of the façade 7.

The presence of two temperature sensors 21, 22 in the temperature detection device 1 makes it possible to take account of the heat released by all the electronic and/or electrical components located in the space 101 when calculating the temperature Ta of the air A in the passenger compartment 100. Such components are, for example, the main electronic card 10. More specifically, to take account of the heat released by the components in the space 101, the second end 6a is open.

Given their location in the air duct 4, the first temperature sensor 21, located alongside the first portion 5, measures the temperature T1 of the air A in the passenger compartment 100 and the second temperature sensor 22, located alongside the second end 6a, measures the temperature T2 of the air in the space 101. Thus, the measurement of the temperature T2 makes it possible to determine the influence of the heat released by the components on the temperature detection device 1. Consequently, the algorithm for calculating the value of the temperature Ta of the air in the passenger compartment 100 takes account of the value of the temperature T2 and takes the following form: $Ta=T1-K(T2-T1)$.

Figure 3:
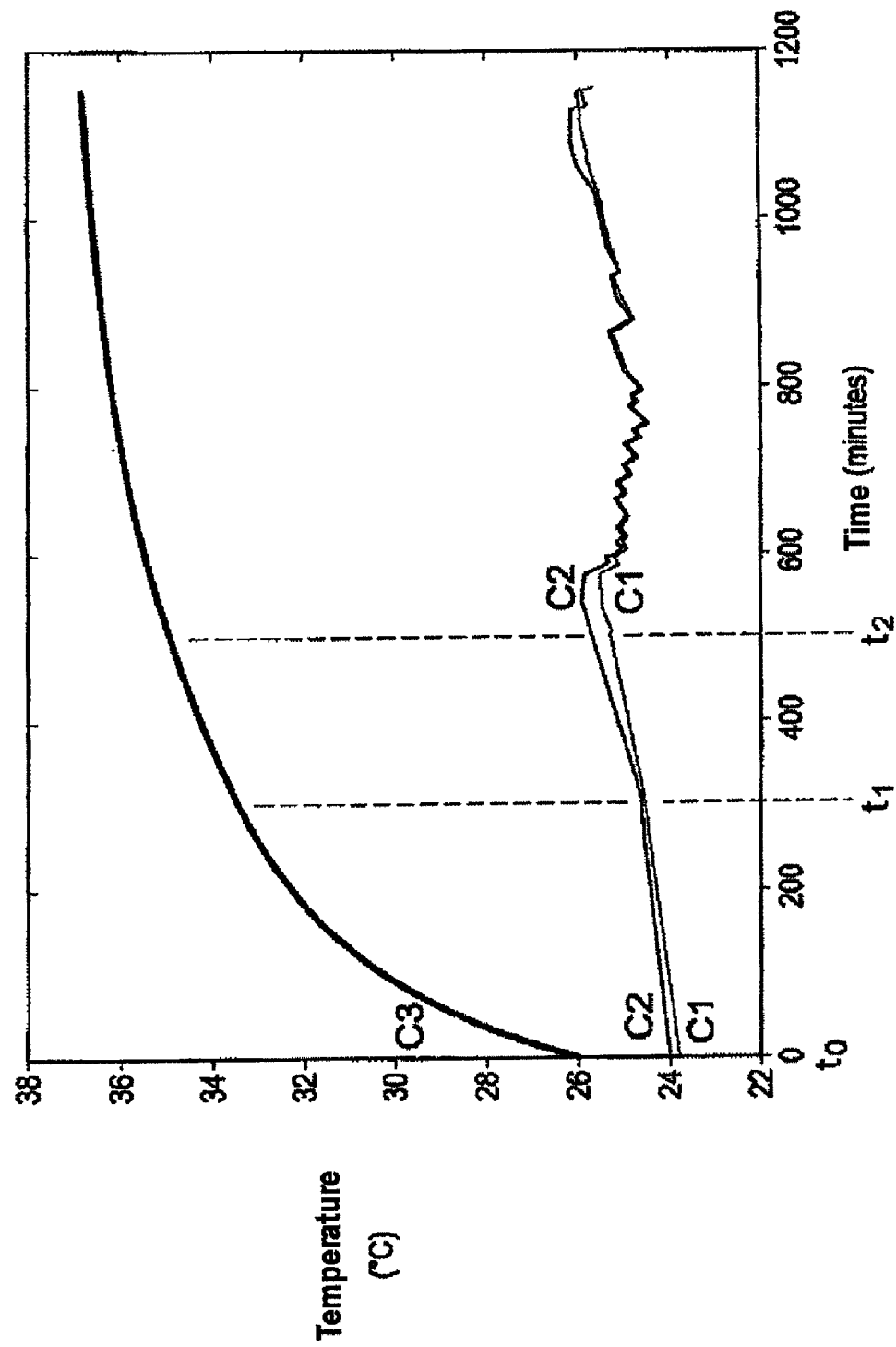
FIG. 3 is a diagram of the temperature variation of the air as a function of time according to a temperature detection device including two temperature sensors.

FIG. 3 illustrates a diagram of the temperature variation detected by the temperature sensors 21 and 22 as a function of time. The curve C1 represents the temperature variation T1 detected by the first temperature sensor 21. The curve C2 represents the temperature variation T2 detected by the second temperature sensor 22. The curve C3 represents the temperature variation of the heat released by the electronic and/or electrical components situated in the space 101. A time $t_0$ corresponds to the starting up of the motor vehicle and consequently of all the electronic components in the space 101. Between time $t_0$ and a time $t_1$, corresponding to approximately 300 minutes, the two temperature sensors 21, 22 measure the same temperature of the air A1 in the air duct 4. From the time $t_1$, the façade 7 is subjected to sunlight, which provokes an increase in the temperature Ta1 of the air A1 in the air duct 4. Since the temperature detection device 1 comprises a means specifically for preventing the direct influence of solar rays RS on the temperature sensors 21, 22 and the two temperature sensors 21 and 22 are thermally coupled, the heat released by the solar rays RS is taken into account in the same way by the two temperature sensors 21 and 22. Between the time $t_1$ and a time $t_2$, corresponding to 500 minutes, the temperature of the electronic components become high enough for the temperature T2 detected by the second temperature sensor 22, situated alongside the second end 6a, to be higher than the temperature T1 detected by the first temperature sensor 21, situated alongside the first end 5a. Thus, the measurement of the temperature T2 makes it possible to take account of the heating of the electronic components in the space 101 when calculating the temperature Ta of the air in the passenger compartment 100. Because of this, an accurate determination of the real value of the temperature Ta of the air A in the passenger compartment 100 is made. In the case where the temperature detection device comprises at least two temperature sensors, the distance D2 separating the first temperature sensor 21 from the second temperature sensor 22 must be great enough for the first temperature sensor not to be influenced by the heat released by the electronic components in the space 101.

The invention also relates to a control panel, not represented, for a ventilation, heating and/or air conditioning system, comprising a temperature detection device 1 as described hereinabove. The control panel comprises the main electronic card 10.

The temperature sensors used in the various embodiments are of NTC (Negative Temperature Coefficient) type.

The invention claimed is:

1. A temperature detection device for detecting a temperature of air in a passenger compartment of a vehicle, comprising:
    at least two temperature sensors housed in an air duct having a first portion, wherein the air duct is in aeraulic communication with the air of the passenger compartment through the first portion,
    wherein the first portion has a shape of a grid to prevent the direct influence of solar rays on the at least two temperature sensors, and
    wherein the at least two temperature sensors are fixed onto an electronic card that is partially housed in the air duct.

2. The temperature detection device as claimed in claim 1, wherein one of the at least two temperature sensors is spaced apart from the first portion by a distance of between 1 and 10 mm.

3. The temperature detection device as claimed in claim 1, wherein the first portion of said air duct is housed in a façade.

4. The temperature detection device as claimed in claim 3, wherein the grid is an integral part of the façade.

5. The temperature detection device as claimed in claim 3, wherein the air duct is arranged vertically relative to the façade.

6. The temperature detection device as claimed in claim 1, wherein the air duct is open at both its ends.

7. The temperature detection device as claimed in claim 1, wherein the air duct has a length of between 10 and 100 mm and a width of between 10 and 30 mm.

8. The temperature detection device as claimed in claim 1, wherein the at least two sensors are thermally coupled.

9. The temperature detection device as claimed in claim 1, wherein a first of the at least two temperature sensors is spaced apart from a second of the at least two temperature sensors by a distance of between 5 and 30 mm so as to measure two different temperatures.

10. The temperature detection device as claimed in claim 9, wherein the first temperature sensor is located alongside a first end of the air duct and the second temperature sensor is located alongside a second end of the air duct.

11. The temperature detection device as claimed in claim 10, wherein the electronic card comprises a first connector linked via connecting wires to the at least two temperature sensors.

12. The temperature detection device as claimed in claim 11, wherein the electronic card on which the at least two temperature sensors are fixed is operatively connected to the main electronic card via a second connector.

13. The temperature detection device as claimed in claim 12, wherein the second end is open and a portion of the electronic card receiving the first connector projects from the air duct at a level of the open second end.

14. The temperature detection device as claimed in claim 1, wherein the temperature detection device is part of a control panel.

15. The temperature detection device as claimed in claim 14, further comprising a main electronic card, wherein a distance between a second end of the air duct and the main electronic card is between 1 and 20 mm.

* * * * *